(12) United States Patent
Agee

(10) Patent No.: US 10,329,492 B1
(45) Date of Patent: Jun. 25, 2019

(54) SAFE SHUTDOWN FOR A FISCHER TROPSCH REACTOR

(71) Applicant: Emerging Fuels Technology, Inc., Tulsa, OK (US)

(72) Inventor: Kenneth L. Agee, Tulsa, OK (US)

(73) Assignee: Emerging Fuels Technology, Inc., Tulsa, OK (US)

(*) Notice: Subject to any disclaimer, the term of this patent is extended or adjusted under 35 U.S.C. 154(b) by 0 days.

(21) Appl. No.: 16/189,534

(22) Filed: Nov. 13, 2018

(51) Int. Cl.
*B01J 8/00* (2006.01)
*C10G 2/00* (2006.01)

(52) U.S. Cl.
CPC ........... *C10G 2/34* (2013.01); *B01J 8/001* (2013.01); *B01J 8/0015* (2013.01); *C10G 2300/1022* (2013.01); *C10G 2300/4031* (2013.01)

(58) Field of Classification Search
CPC .... C10G 2/32; C10G 2/342; C10G 2300/4031
See application file for complete search history.

(56) References Cited

U.S. PATENT DOCUMENTS

| 8,933,136 B2 | 1/2015 | Bezemer et al. |
| 2008/0262112 A1 | 10/2008 | Marion et al. |
| 2009/0197980 A1* | 8/2009 | Maretto ............ C10G 2/33 518/705 |

* cited by examiner

*Primary Examiner* — Jafar F Parsa
(74) *Attorney, Agent, or Firm* — Head, Johnson, Kachigian & Wilkinson, PC

(57) ABSTRACT

A process to safely shutdown a Fischer Tropsch reactor is provided. The process can be used for a routine shutdown but is specifically designed for emergency shutdowns such as during a thermal excursion or power failure or equipment failure.

9 Claims, 1 Drawing Sheet

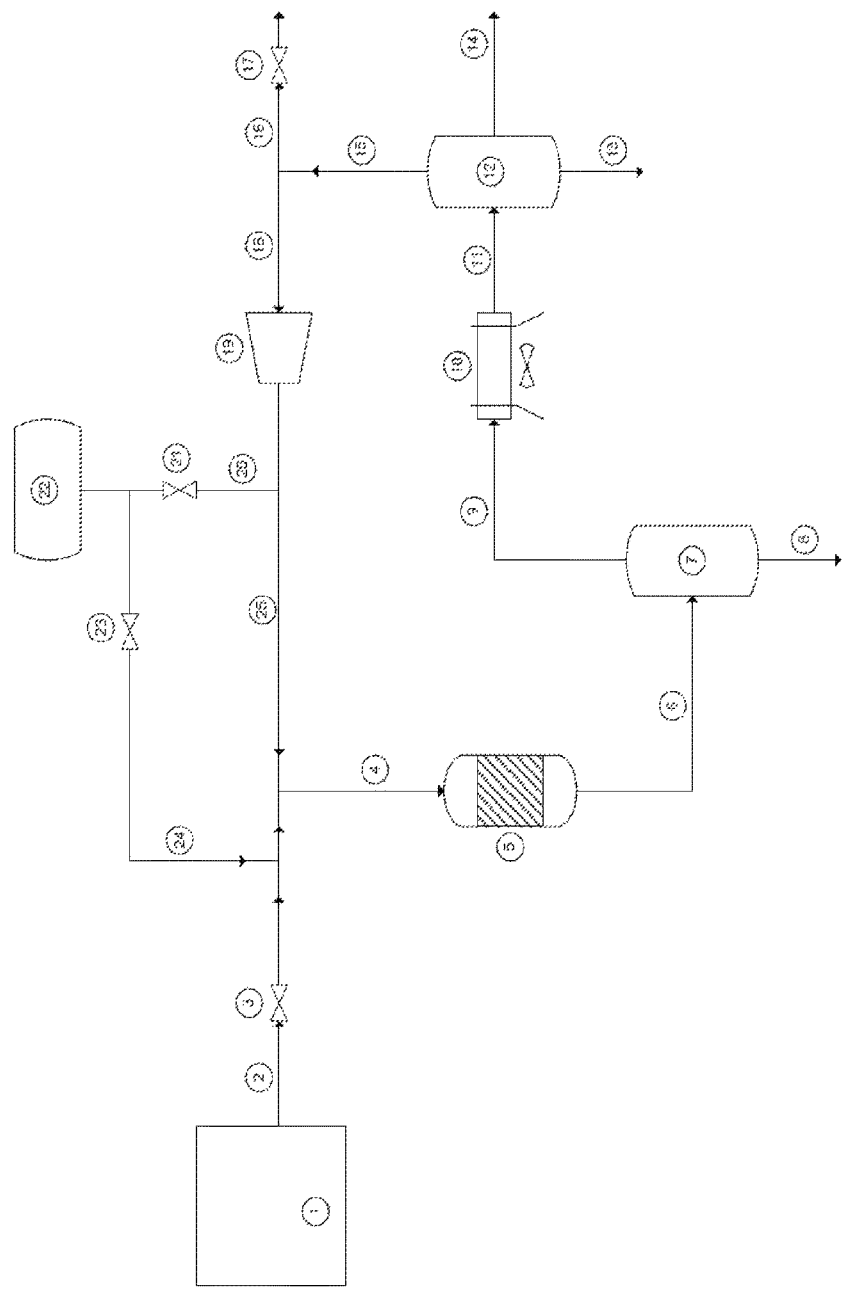

SAFE SHUTDOWN FOR A FISCHER TROPSCH REACTOR

CROSS REFERENCE

Not Applicable.

BACKGROUND OF THE INVENTION

Field of the Invention

This invention relates generally to a process to safely shutdown a Fischer Tropsch reactor, and more particularly, but not by way of limitation, to a process that can be used for routine shutdown but is specifically designed for emergency shutdowns, such as during a thermal excursion or power failure or equipment failure.

Description of the Related Art

Various processes are known for the conversion of carbonaceous feeds into normally liquid products such as methanol, higher alcohols, and hydrocarbon fuels and chemicals, particularly paraffinic hydrocarbons. Such processes are directed at the objective of adding value to the feedstock by making a transportable, more valuable product such as diesel fuel, jet fuel, or chemicals such as base oils, solvents, or drilling fluids.

Natural gas is comprised primarily of methane, which may be produced with or without associated oil production. When natural gas is co-produced with oil, it is called associated gas. Natural gas may be free flowing under substantial pressure or it may be at very low pressure. It may contain other heavier C2+ hydrocarbons and inert gases such as nitrogen, carbon dioxide, or helium. It may also contain contaminants such as hydrogen sulfide, mercury, or arsenic. Natural gas may require one or more clean up steps to remove contaminants or inert components before being fed to a gas-to-liquids process.

Biogas is a mixture of different gases produced by the breakdown of organic matter in the absence of oxygen. Biogas can be produced from raw materials such as agricultural waste, manure, municipal waste, plant material, sewage, green waste, or food waste. Biogas is a renewable energy source.

Biogas can be produced by anaerobic digestion with methanogen or anaerobic organisms, which digest material inside a closed system, or fermentation of biodegradable materials. This closed system is called an anaerobic digester, a biodigester, or a bioreactor. The closed system may also be a landfill in which the biogas is referred to as landfill gas.

Biogas comprises methane and carbon dioxide and may have small amounts of hydrogen sulfide, moisture, siloxanes, and other contaminants. The methane can be combusted and used as a fuel, used for heating, used to power a gas engine, or used to drive a turbine or heavy equipment.

Biogas can be compressed, the same way that natural gas is compressed to CNG, and used to power motor vehicles. Biogas can be cleaned and upgraded to natural gas standards, when it becomes known as bio-methane or renewable natural gas. Biogas is considered to be a renewable resource and as such it generates no net carbon dioxide. From a carbon perspective, as much carbon dioxide is absorbed from the atmosphere in the growth of the primary bio-source as is released when the material is ultimately converted to energy.

A biogas plant is the name often given to an anaerobic digester that treats farm wastes. Biogas can be produced using anaerobic digesters (air-tight tanks with different configurations). These plants can be fed with energy crops or biodegradable wastes including sewage sludge and food waste. During the process, micro-organisms transform biomass waste into biogas comprising methane and carbon dioxide and digestate.

Landfill gas is produced by wet organic waste decomposing under anaerobic conditions. The waste is covered and mechanically compressed by the weight of the material that is deposited above. This material prevents oxygen exposure thus allowing anaerobic microbes to thrive. Biogas builds up and is slowly released into the atmosphere if the site has not been engineered to capture the gas. Landfill gas released in an uncontrolled way can be hazardous since it can become explosive when it escapes from the landfill and mixes with oxygen. The lower explosive limit is 5% methane and the upper limit is 15% methane.

The methane in biogas is estimated to be 28 times more potent a greenhouse gas than carbon dioxide. Therefore, uncontained landfill gas, which escapes into the atmosphere may significantly contribute to the effects of global warming. In addition, volatile organic compounds (VOC's) in landfill gas contribute to the formation of photochemical smog.

It is highly desirable to process these gases to reduce emissions and produce valuable useful products.

The composition of biogas varies depending upon the substrate composition, as well as the conditions within the anaerobic reactor (temperature, pH, and substrate concentration). Landfill gas typically has methane concentrations around 50%. If a Landfill or bio-digester is not operated properly, the resulting biogas may contain much less than 50% methane.

Associated gas is the gas associated with oil production. Producing oil wells have a very wide range of gas to oil ratio from zero to very high. When there is a substantial volume of gas associated with oil production, it is often rich gas comprising methane and substantial amounts of ethane and higher hydrocarbon gases. Associated gas is often separated from the oil at low pressure and, if there is no market for the gas in close proximity to the well, it may be flared.

Methane containing gases such as natural gas, associated gas, biogas, and landfill gas can be converted to synthesis gas comprising carbon monoxide and hydrogen. Several methods of producing synthesis gas from methane containing gas are known to those skilled in the art, such as steam reforming, partial oxidation, and autothermal reforming. Such processes may include additional steps, such as pre-reforming and water gas shift or hydrogen removal by membrane or pressure swing adsorption (PSA). All the above processes can be used to make synthesis gas, including others known to one skilled in the art.

Non-methane feeds may be used to make synthesis gas, such as coal, oil, biomass solids, municipal waste, and many other waste streams. When solid feeds are used, they may be transformed to synthesis gas by gasification, pyrolysis, torrefaction, or any combination of reactions with oxygen or steam to produce synthesis gas. Synthesis gas produced by these methods may be subjected to a variety of steps for H2:CO ratio adjustment or contaminant removal.

Synthesis gas produced from any of the above feedstocks and methods can be converted to heavy hydrocarbon products by a Fischer Tropsch catalyst in a Fischer Tropsch reactor. Any type of Fischer Tropsch catalyst or reactor known to one skilled in the art may be operated in a way described herein subject to the present invention.

The heavy hydrocarbon products of the process can be subjected to further workup or processing by hydroprocessing such as hydrocracking and/or hydroisomerization and distillation resulting in, for example, a high yield of high-quality middle distillate products such as jet fuel or diesel fuel. The heavy hydrocarbon products of the Fischer Tropsch reaction can also be upgraded to specialty products such as solvents, drilling fluids, waxes, or lube base oils due to the high purity and broad molecular weight range of the Fischer-Tropsch products.

Processes that convert carbonaceous feeds and/or light hydrocarbons to heavier hydrocarbon products generally have at least three steps: 1) conversion of the feedstock to synthesis gas comprising carbon monoxide and hydrogen; 2) conversion of the synthesis gas to heavy hydrocarbons via a Fischer-Tropsch reaction; and 3) hydroprocessing the heavy hydrocarbon product to produce one or more finished hydrocarbon products.

The efficiency and effectiveness of the subject process depends not only on the effectiveness of the three steps, but also on how the steps are integrated. Normal operation of a process to convert carbonaceous feeds into heavy hydrocarbon products requires various procedures that allow for transition from operating to non-operating states including routine start-up and shutdown as well as emergency procedures, particularly emergency shutdown. A Fischer Tropsch catalyst is typically a very expensive component and protecting the catalyst from damage or loss of activity is a high priority. Procedures designed to protect the Fischer Tropsch catalyst are an important part of any process for converting carbonaceous feeds to heavy hydrocarbon products.

It is an objective of the present invention to provide a safe method for the shutdown of a Fischer Tropsch reactor. The method can be used for a routine shutdown but is especially designed for an emergency shutdown. Emergency conditions could include but not be limited to power loss, loss of feed gas, loss of the recycle compressor, thermal excursion or runaway, and natural disaster.

SUMMARY OF THE INVENTION

In general, in a first aspect, the invention relates to a process for shutting down a Fischer Tropsch reactor, the process comprising: a) stopping a reactor fresh feed; b) opening or increasing flow to a reactor tail gas purge line to maintain adequate flow through the reactor; c) allowing pressure within the reactor to drop to a level below that of a sweep gas reservoir; d) opening a sweep gas valve to allow flow from the sweep gas reservoir to a reactor inlet; e) allowing a sweep of sweep gas through the reactor to substantially remove fresh feed gas; and f) closing the sweep gas valve and blocking the purge gas line so that flow through the reactor goes to zero.

The sweep gas reservoir may be initially charged with an inert gas. The reactor tail gas purge line may have a lower flow if a recycle compressor is running during the shutdown process than if a recycle compressor is not running during the shutdown process. Pressure in the sweep gas reservoir may be maintained at a pressure equal to that of a recycle compressor discharge, or at a pressure equal to that of the tail gas. After step (f), the reactor may have a temperature and a pressure lower than normal operating temperature and pressure.

The reactor may be a vertical tubular fixed bed reactor, microchannel reactor, slurry bubble column reactor, or fluidized bed reactor. The sweep gas reservoir may be filled with tail gas or a combination of tail gas and other gas, the other gas comprising nitrogen, argon, carbon dioxide, methane, ethane, or hydrogen. The sweep gas reservoir may be filled with tail gas during normal operation of the reactor.

BRIEF DESCRIPTION OF THE DRAWINGS

FIG. 1 is a diagrammatic view of the system of the present invention.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a process to safely shutdown a Fischer Tropsch reactor.

The Fischer Tropsch reaction is highly exothermic and therefore temperature control is very important. A Fischer Tropsch reactor must be monitored carefully to maintain safe operating conditions at all times, particularly to avoid thermal runaways. Operating failures that could result in downtime or replacement of catalyst must be avoided as much as possible. Normal operation may include monitoring of reactor temperatures and adjusting operating conditions to protect from thermal excursions. Upset conditions that result in a thermal event are not the only risk to the Fischer Tropsch reactor and catalyst. A power loss or a loss of feed gas or a compressor failure could all cause a thermal excursion in the Fischer Tropsch reactor as loss of flow will cause a loss of heat transfer capacity and could cause a runaway.

The present invention provides a process to safely shutdown the Fischer Tropsch reactor so that problems can be addressed while the catalyst is maintained in a safe state for subsequent re-start. If any condition is reached that could trigger a runaway or unsafe condition for the Fischer Tropsch catalyst, the process described herein may be used. The process of the present invention may be automated so that an unsafe condition which may result in loss of activity or damage to the catalyst will trigger the shutdown process without operator input. If an operator is occupied with other problems in the plant and a thermal excursion event begins, the control system may be designed to catch the event and trigger the shutdown process. If the operator sees conditions begin to develop that cannot be reversed, the process may be initiated by the operator by pressing a single switch to start the process sequence.

The shutdown process may begin by shutting off the supply of fresh synthesis gas. Exit gas may continue to flow for a brief time until the pressure in the reactor is low enough to establish sweep gas flow. A pressure vessel may be provided in standby, filled with a sweep gas, preferably reactor tail gas, and maintained at reactor inlet or recycle compressor discharge pressure. If the reactor configuration does not have a recycle compressor, the pressure vessel may be at tail gas pressure. Once the reactor drops below this pressure, the standby volume of reactor tail gas may be opened to sweep the reactor of fresh syngas and replace it with reactor tail gas, which may be much less reactive than fresh feed gas. Only a few reactor volumes of tail gas may be required to adequately sweep the reactor. During this sweep, the reactor pressure may continue to drop. At this point, the reactor may be blocked in and may contain reactor tail gas, which may react for a few minutes (producing a very small exotherm) until the reactive components are consumed. At that point, the reactor temperature may be reduced to a safe temperature for a restart of the reactor.

A temperature reduction step may be built into the shutdown sequence; however, dropping the temperature alone may not be adequate for many emergency shutdown conditions as temperature reduction for a steam cooled reactor requires a blowdown of the steam drum, which takes too much time for an emergency condition. Also, a full blowdown of the steam drum will make a subsequent startup take much longer. The process of the present invention may result in a final reactor pressure and steam drum pressure that is only slightly less than the normal operating pressure so that the reactor can be made ready for a restart soon after the shutdown event. Any exotherm experienced by the reactor during the shutdown may be very mild and may not damage the Fischer Tropsch catalyst.

The invention is best understood by reference to the attached FIGURE. FIG. 1 is a preferred embodiment of the present invention wherein the process is described with the use of a single reactor operating in recycle mode. The Fischer Tropsch reactor may be any type of reactor known to one skilled in the art such as a fixed bed vertical tubular reactor, a microchannel reactor, a slurry bubble column reactor, or a fluidized bed reactor. The reactor may be operated in series or in recycle mode or a combination of the two. If there is more than one reactor they may be shut down as a group or they may be shut down individually.

The process of the present invention may be used to shut down the reactor under any operating condition from normal operation to emergency. Once shut down, the reactor may be held at the final shut down conditions until problems are resolved and the plant is ready to restart. The final shutdown may result in the reactor being slightly below normal operating temperature and pressure, which can be adjusted before start up as needed.

Referring to the FIGURE, syngas source (1) may be fed to the reactor via feed line (2) through valve (3) and blended with recycle gas (25). The combined gases may be fed to Fischer Tropsch reactor (5) via reactor inlet (4). The gases may pass through the catalyst bed and exit the Fischer Tropsch reactor via line (6). Heavy waxy components (8) may be removed in hot separator (7). Unreacted gases, water, and light hydrocarbon gases may be transferred via line (9) to cooler (10) where water and most of the naphtha and distillate range hydrocarbons are condensed. Cooled gases and light products may be transferred via line (11) to cold separator (12) where water (13) and light hydrocarbon products (14) are removed. Unreacted gases may be removed overhead from separator (12) and split into a purge stream (16) and a recycle stream (18). The purge stream may exit through valve (17). The recycle stream (18) may be boosted in recycle compressor (19). A small slipstream of boosted recycle gas (20) may be transferred trough valve (21) into storage tank (22) for emergency shutdown use. Recycle stream (25) may be blended with fresh feed gas and transferred to the reactor via line (4). During a shutdown, the process of the present invention can safely bring the reactor to a resting state where it can be held indefinitely until needed for a restart.

The shutdown can be initiated after any one of many operating problems such as loss of power, loss of feed gas, loss of recycle compressor, or thermal excursion in the Fischer Tropsch reactor. If the recycle compressor is operational, it may remain in operation during the shutdown. If the recycle compressor is not operational during the shutdown process, the valve timing and sequence may be adjusted for the loss of the recycle compressor.

During normal operation, the sweep gas storage tank (22) may be filled with Fischer Tropsch reactor tail gas, which may be held in the storage tank as a reservoir for any shutdown event. Additional gases may be added to the tank such as nitrogen, argon, carbon dioxide, methane, ethane, or hydrogen, if desired. For the initial operation, an inert gas as provided herein can be added to the tank and replaced with tail gas when normal operations are established. The following discussion assumes this tank has been filled with a charge of reactor tail gas. At the initiation of a shutdown event, the feed gas valve (3) may be closed, shutting off fresh feed, and purge gas valve (17), which should normally be open, may open further to increase the tail gas flow. Ideally, the flow through valve (17) for a brief period may be between 50% and 150% of the flow in the reactor during normal operation. If the recycle compressor is not operational at the shutdown, the purge gas flow may be higher than if the compressor was operational. Under most if not all circumstances, the purge gas flow for normal operation may be lower than the desired flow for a shutdown purge. It is desirable to control this flow in the shutdown sequence. This line typically goes to the fuel gas header or to flare. During an emergency, the purge gas line may be routed to flare. At the same time as the opening of valves (3) and (17) or shortly thereafter, valve (23) may open and control a volume of sweep gas from storage vessel (22) to the reactor inlet. For a brief period, the reactor may be purged of fresh gas, which is replaced with sweep gas, which preferably comprises tail gas, and then valve (17) and valve (23) may close to block in the reactor.

The shutdown process of the present invention will most likely be automated by the process control system so that it will be initiated by one of two methods. Either the control system will be tripped by a safety shutdown, such as a temperature runaway in the reactor, or the operator may push a shutdown switch. In both cases, the system may preferably be automated so that pressures and flows are monitored as the sequence of valves are opened and closed to make sure the system is shutdown safely. The status of the system valves and sweep gas storage tank may be displayed during normal operation so the operator knows the system is ready for use. Safely shutting down the Fischer Tropsch reactor is a critical operating procedure that must be ready at all times during normal operation.

The embodiments discussed herein are merely illustrative of specific manners in which to make and use the invention and are not to be interpreted as limiting the scope of the instant invention.

Whereas, the devices and methods have been described in relation to the drawings and claims, it should be understood that other and further modifications, apart from those shown or suggested herein, may be made within the spirit and scope of this invention.

What is claimed is:

1. A process for shutting down a Fischer Tropsch reactor, the process comprising:

a) stopping a reactor fresh feed;
b) opening or increasing flow to a reactor tail gas purge line to maintain adequate flow through the reactor;
c) allowing pressure within the reactor to drop to a level below that of a sweep gas reservoir;
d) opening a sweep gas valve to allow flow from the sweep gas reservoir to a reactor inlet;
e) allowing a sweep of sweep gas through the reactor to substantially remove fresh feed gas; and
f) closing the sweep gas valve and blocking the purge gas line so that flow through the reactor goes to zero.

2. The process of claim 1 where the sweep gas reservoir is initially charged with an inert gas.

3. The process of claim 1 where the reactor tail gas purge line has a lower flow if a recycle compressor is running during the shutdown process than if a recycle compressor is not running during the shutdown process.

4. The process of claim 1 where pressure in the sweep gas reservoir is maintained at a pressure equal to that of a recycle compressor discharge.

5. The process of claim 1 where pressure in the sweep gas reservoir is maintained at a pressure equal to that of the tail gas.

6. The process of claim 1 where, after step (f), the reactor has a temperature and a pressure lower than normal operating temperature and pressure.

7. The process of claim 1 where the reactor is a vertical tubular fixed bed reactor, microchannel reactor, slurry bubble column reactor, or fluidized bed reactor.

8. The process of claim 1 where the sweep gas reservoir is filled with tail gas or a combination of tail gas and other gas, the other gas comprising nitrogen, argon, carbon dioxide, methane, ethane, or hydrogen.

9. The process of claim 1 where the sweep gas reservoir is filled with tail gas during normal operation of the reactor.

* * * * *